United States Patent [19]

Castaneda et al.

[11] 3,899,818

[45] Aug. 19, 1975

[54] SURVEYORS TAPE REPAIR TOOL

[76] Inventors: Ben Castaneda, 849 Camino Consuelo; Norbert A. Staab, 1130 Camino Delora, both of, Santa Fe, N. Mex. 87501

[22] Filed: Aug. 21, 1974

[21] Appl. No.: 499,218

[52] U.S. Cl. ............................ 29/243.56; 140/93.4
[51] Int. Cl.² ......................................... B23P 11/00
[58] Field of Search ...... 29/243.56; 140/123, 123.5, 140/93.4; 269/37; 81/9.1 R

[56] References Cited
UNITED STATES PATENTS

| | | | |
|---|---|---|---|
| 817,513 | 4/1906 | Parker | 269/37 |
| 945,185 | 1/1910 | Milas | 269/37 |
| 2,223,164 | 11/1940 | Childress | 140/93.4 |

FOREIGN PATENTS OR APPLICATIONS

| | | | |
|---|---|---|---|
| 671,083 | 1/1939 | Germany | 81/9.1 R |
| 204,258 | 1/1955 | Australia | 140/123.5 |

*Primary Examiner*—James L. Jones, Jr.
*Attorney, Agent, or Firm*—Henry Heyman

[57] ABSTRACT

A hand tool for repairing broken metal measuring tapes, particularly surveyors tapes, comprising tape aligning and clamping troughs affixed to the side cheeks of a sleeve applying and crimping device, to apply a sleeve in tight enveloping relationship over a longitudinal portion of aligned tape broken ends, and opposed crimps are formed in the sleeve and tape ends on both sides of the break.

4 Claims, 5 Drawing Figures

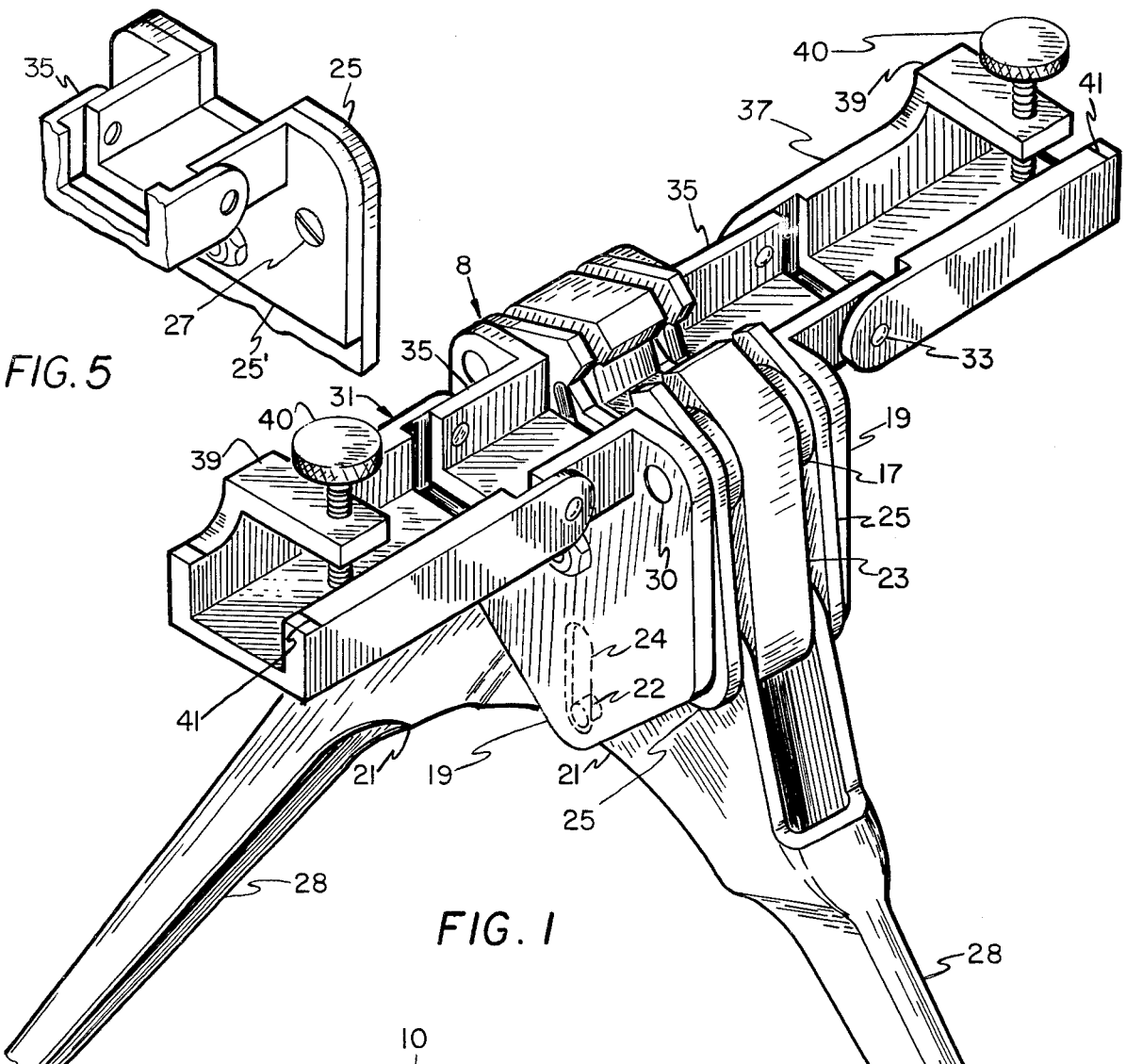
FIG. 5
FIG. 1
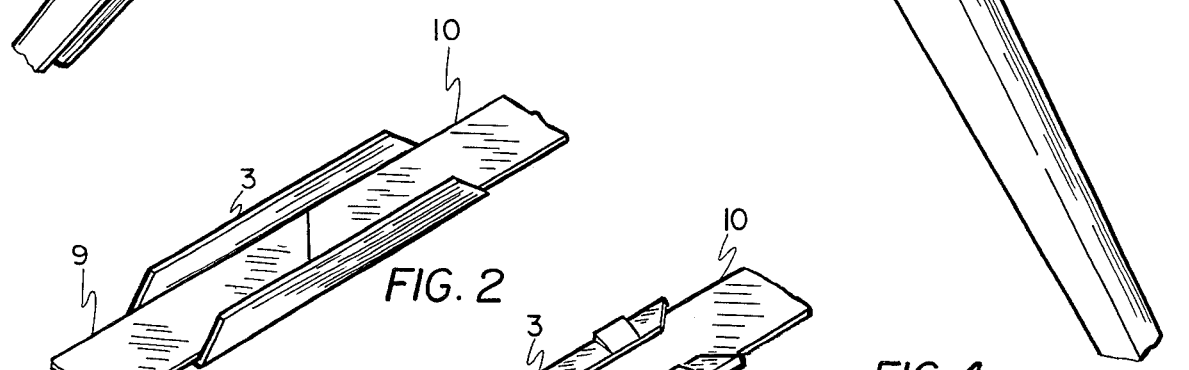
FIG. 2
FIG. 3
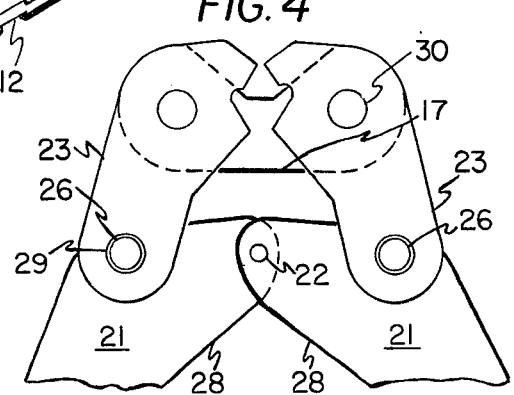
FIG. 4

SURVEYORS TAPE REPAIR TOOL

SUMMARY OF THE INVENTION

This invention relates to a hand tool and method for repairing broken surveyors tapes in the field. Such tapes are susceptible to breakage inasmuch as they are made of springy steel and when snagged in weeds or the like are, if pulled, subject to looping, kinking and breaking. Usually the break is not at right angles to the direction of elongation of the tape, but instead, due to closing a loop the kink is slanted or scarfed. Such tapes are expensive to replace and are most likely to be broken in the field on the job, and unless a convenient portable manual tool is available to make a repair, the result is expense and inconvenience.

The surveyors tape is usually 100 or more feet in length. In order to obtain a true straight line measurement in the field, the tape is pulled taut. Thus there is considerable longitudinal strain which results in an inordinate bending moment if the tape ends are misaligned. It is therefore necessary that a splicing tool must accurately align the tape end portions during the splicing operation.

In accordance with the present invention, a tool is provided which holds the tape end portions adjacent the break in accurate alignment and accurate end to end relationship, applies an elongated connecting enveloping sleeve around the tape end portions on both sides of the break and impresses a pair of crimps, aligned crosswise of the tape in the sleeve and underlying tape end near the ends of the sleeve. The repair is made easily and quickly and is as strong or stronger than the original tape.

DETAILED DESCRIPTION OF THE INVENTION

Other features, objects and advantages of the invention will become apparent from reading the following detailed description of the invention with reference to the accompanying drawing which shows by way of illustration and not limitation, a preferred embodiment of the invention.

In the drawings:

FIG. 1 is a side perspective view of the tape repair tool of the present invention.

FIG. 2 is a perspective view of an open repair sleeve in place on broken tape ends.

FIG. 3 is a side perspective view of the repair sleeve and tape after the tool of FIG. 1 has forced the sleeve into tight envelopment with the tape and has formed crimps in both sleeve and tape.

FIG. 4 is a cross sectional side view of the crimping elements of the tool.

FIG. 5 is a side perspective view of a tape repair tool attachment adapted to be affixed to an existent sleeve applying and crimping tool.

The hand tool 8 shown in FIG. 1, when handles 28 are spread apart, accepts repair sleeve 3 and broken tape ends 9 and 10 shown in FIG. 2. The folding and crimping elements of the tool are fixed plates 17 and pivoted plates or jaws 23 and 25 more clearly seen in FIG. 4. Jaws 23 and 25 pivot about pin 30 and are operated by a compound lever arrangement. Handles 28 pivot on elongated pins 26 inserted in journals 29 in each of the jaws 21 and 23. Handles 28 are integral with overlapping flanges 21 which are pivotally connected by pin 22 seen in FIG. 4. The ends of pin 22 slide in recesses 24 in the inside face of side plates 19, as shown in dotted lines in FIG. 1. When handles 28 are spread apart, sliding pin 22 moves downward and causes the lower arms of jaws 23 and 25 to move inward. When the handles 28 are moved inward, pin 22 moves to an angular position relative to a straight line between journals 29 thereby causing the arms of jaws 23 and 25 to pivot outward about pins 30 forcing the jaws to squeeze and crimp position shown in FIG. 4. The particular mechanism of the squeeze and crimping tool thus far described is available in the prior art as a package banding tool and is not per se claimed to be part of the present invention. For the purpose of the present invention the tool is modified in that middle jaw 23 is thicker than is normally the case in a banding tool. The reason for this is that in the banding art, the ends of the band are lapped so that the pairs of crimps can be longitudinally close together. In the repair of surveyors tapes, however, the break is usually on a slant or scarf thereby necessitating two pairs of crimps spaced longitudinally further apart. The crimps or upsets are actually formed by stationary plates 17 when jaws 23 and 25 force the sleeved tape downward. Accordingly, plates 17 are spaced apart the proper distance by thick inner jaw 23.

In order to fix the broken tape ends in accurate longitudinal position a pair of trough stubs 35 are affixed in accurate alignment to side plates 19. Additional accuracy is afforded by extensions 31 and 37. To the end that the tool can be folded compactly for convenient carrying by the conveyor, the extensions 31 and 37 are hinged by hinge pins 33 on the end of the corresponding trough stubs 35. The width of the interior of the trough is preferably a sliding fit with the tapes to be mended.

In order that a lone operator can perform the mending operation with ease, a cross wire flange 39 is affixed to a side wall of each trough and is drilled and threaded to mate with a clamp screw 40.

To the end that the tape will be spliced with close longitudinal accuracy even though the break may be stretched or torn so as to require overlapping of a small portion, or paring of the stretched fragment, indicia 41 are scribed in the trough surfaces at spacings of even inches or centimeters as the case may be from the middle of the crimping tool. The operator places and clamps the broken tape end portions successively in the troughs and crimping tool after first placing an open sleeve in the crimping tool. The handles 28 are then pressed together and the repair is completed.

The embodiment of FIG. 1 shows the tape aligning troughs to be integral with crimping tool side plates 19. It is feasible to adapt a pre-existing crimping tool to mend surveyors tapes by use of the attachable troughs shown in FIG. 5. In this embodiment, the troughs 31 attach to a right angular flange plate 25'. Flange plate 25 is attached to the exterior face of crimping tool side plate 25 by any suitable means such as screws 27. Otherwise the mechanism is like the mechanism of FIG. 1.

Although the invention has been described as guide and clamping troughs in combination with one well known form of package banding tool, it is apparent that other existent forms of banding tools may be suitable for the attachment of surveyors tape side guides and clamps as described herein, and it is within the spirit of this invention that any suitable sleeve applying and crimping device may be used.

What is claimed is:

1. A manually operated portable surveyors metal tape repair tool comprising means for confining, and means for clamping, the broken ends of the tape respectively in longitudinal alignment and in selected longitudinal non-overlapping position within a malleable metal trough, two-handled plier-like means for straddling the metallic metal trough when open, and for upsetting when closed, the malleable metal trough for tightly enclosing the broken end portions of the tape in a malleable metallic sleeve and for impressing at least one pair of crimps in the sleeve so formed and the enveloped tape ends at right angles to the direction of elongation of the tape, on each side of the broken tape ends.

2. The device of claim 1 in which the means for confining the broken ends of the tape in longitudinal alignment is a pair of opposed longitudinally aligned elongated troughs, each having an end affixed to opposite faces of the plier-like means, and each having a cross sectional width equal to the width of the tape to be mended, and the means for clamping the broken ends of the tape in selected longitudinal non-overlapping position is a bridge affixed to at least one side wall of each trough extending over the trough and having a threaded aperture and a threaded thumb screw extending through the bridge for compressively contacting an exposed surface of the positioned tape broken end.

3. The manually operated portable surveyors metal tape reapir tool of claim 2 in which the plier-like means for straddling the malleable metallic trough when open, and for upsetting, when closed, the malleable metal trough for tightly enclosing the broken end portions of the tape in a malleable metallic sleeve and for impressing crimps in the tape ends and sleeve is a tool having stationary and pivoted jaws in side by side juxtaposition, between planar end plates, said pivoted jaws being associated with a pair of pivoted handles so that in one position of the handles the jaws bound an open face trough adapted to accept the tape ends and an elongated channel shaped sleeve, and in another position of the handles the jaws close together to transform the channel shaped sleeve to a substantially closed flat sleeve, and to upset portions of the sleeve and enveloped end portions of the tape out of the plane of the remaining sleeve and end portions of the tape thereby forming crimps to affix the tape ends in immovable end to end and aligned relationship.

4. The surveyors metal tape repair tool of claim 3 in which each of the opposed longitudinally aligned troughs has a first portion hinged at one end to a fixed portion, the other end of the fixed portion being affixed at right angles to the planar end plate with the trough being in alignment with the open face trough formed by the tool jaws when the pivoted handles are in the said one position.

* * * * *